(12) United States Patent
Maslennikov et al.

(10) Patent No.: US 6,412,105 B1
(45) Date of Patent: Jun. 25, 2002

(54) COMPUTER METHOD AND APPARATUS FOR COMPILATION OF MULTI-WAY DECISIONS

(75) Inventors: Dmitry M. Maslennikov; Valentine G. Tikhonov; Alexander I. Kasinsky; Vladimir Y. Volkonsky, all of Moscow (RU)

(73) Assignee: Elbrus International Limited, George Town (KY)

( * ) Notice: Subject to any disclaimer, the term of this patent is extended or adjusted under 35 U.S.C. 154(b) by 0 days.

(21) Appl. No.: 09/220,501

(22) Filed: Dec. 24, 1998

Related U.S. Application Data

(60) Provisional application No. 60/070,176, filed on Dec. 31, 1997.

(51) Int. Cl.[7] .................................................. G06F 9/45
(52) U.S. Cl. .................................................. 717/9; 717/4
(58) Field of Search ........................... 717/4, 5, 6, 7, 717/8, 9; 712/233–240

(56) References Cited

U.S. PATENT DOCUMENTS

| | | | |
|---|---|---|---|
| 5,339,420 A | | 8/1994 | Hoxey ............................ 717/9 |
| 5,742,803 A | * | 4/1998 | Igarashi et al. ............. 712/233 |
| 5,805,893 A | * | 9/1998 | Sproul et al. ................ 395/705 |
| 5,857,104 A | * | 1/1999 | Natarjan et al. ............. 395/705 |
| 5,878,261 A | * | 3/1999 | Holler et al. ................ 395/709 |
| 6,006,033 A | * | 12/1999 | Heisch ........................ 395/709 |
| 6,035,122 A | * | 3/2000 | Ando .......................... 395/705 |
| 6,049,669 A | * | 4/2000 | Holler ......................... 395/709 |
| 6,115,809 A | * | 9/2000 | Mattson, Jr. et al. ........ 712/239 |

OTHER PUBLICATIONS

Nakatani et al., "Using a lookahead window in a compaction-based parallelizing compiler", IEEE, 1994, pp. 57–68.*
Fisher et al., "Predicting conditional branch directions from previous runs of a program", ASPLOS, ACM, 1992, pp. 85–95.*
Karplus et al., "Efficient hardware for multi-way jumps and pre-fetches", ACM, 1985, pp. 11–18.*
Aho, Alfred V., et al., *Compilers: Principles, Techniques, and Tools*, 1998, pp. 497–500.

* cited by examiner

*Primary Examiner*—Kakali Chaki
(74) *Attorney, Agent, or Firm*—Townsend and Townsend and Crew LLP

(57) ABSTRACT

Computer method of compiling a multi-way decision statement for VLIW processing is described. The method comprises: (a) generating profile data for a multi-way decision statement, such a s a switch statement; identifying at least one most probable alternative of the multi-way decision and a set of constants associated with the identified alternative using the profile data; determining a probable subset of the identified constants based on the profile data; constructing a conditional statement for the identified alternative using the probable subset of constants; and moving out the identified at least one alternative from the multi-way decision statement.

Figure 1:
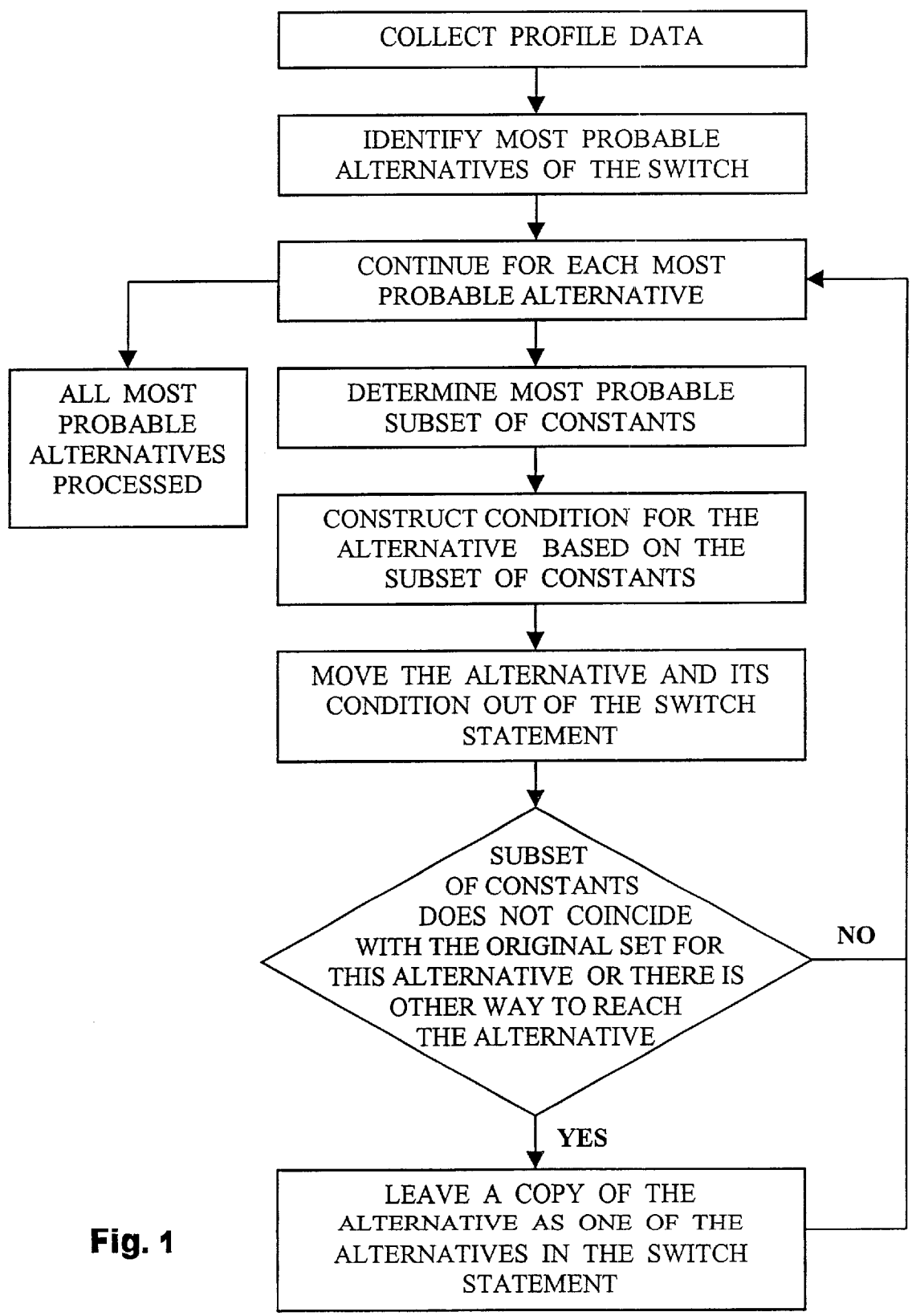

12 Claims, 1 Drawing Sheet

COMPUTER METHOD AND APPARATUS FOR COMPILATION OF MULTI-WAY DECISIONS

This application claims priority over Provisional U.S. Application 60/070,196 filed Dec. 31, 1997.

I. FIELD OF THE INVENTION

The present invention relates to processors and computing devices and more particularly to compiler techniques for optimizing multi-way decision statements and belonging to a set conditions.

II. BACKGROUND OF THE INVENTION

Many practical applications require processing of very large amounts of information in a short period of time. One of the basic approaches to minimizing the time to perform such computations is to apply some sort of parallelism, so that tasks which are logically independent can be performed in parallel. This can be done, for example, by executing two or more instructions per machine cycle, i.e., by means of instruction-level parallelism. Thus, in a class of computers using superscalar processing, hardware is used to detect independent instructions and execute them in parallel, often using techniques developed in the early supercomputers.

Another approach to exploiting instruction level parallelism is used by the Very Long Instruction Word (VLIW) processor architectures in which the compiler performs most instruction scheduling and parallel dispatching at compile time, reducing the operating burden at run time. By moving the scheduling tasks to the compiler, a VLIW processor avoids both the operating latency problems and the large and complex circuitry associated with on-chip instruction scheduling logic. Both superscalar and VLIW processors take advantage of techniques know as pipelining for instruction scheduling optimization.

As known, each VLIW instruction includes multiple independent operations for execution by the processor in a single cycle. A VLIW compiler processes these instructions according to precise conformance to the structure of the processor, including the number and type of the execution units, as well as execution unit timing and latencies. The compiler groups the operations into a wide instruction for execution in one cycle. At run time, the wide instruction is applied to the various execution units with little decoding. The execution units in a VLIW processor typically include arithmetic units such as floating point arithmetic units. An example of a VLIW processor that includes floating point execution units is described by R. K. Montoye, et al. in "Design of the IBM RISC System/6000 floating point execution unit", IBM J.Res. Develop., V. 43 No.1, pp. 61–62, January 1990. Additional examples are provided in U.S. Pat. No. 5,418,975 incorporated herein by reference.

Predicated and speculative computations are employed in VLIW processing as known in the art, see e.g., *Parallel and Distributed Computing Handbook*, Albert Y. Zomaya, Editor, McGraw-Hill 1996, chapter 21, Superscalar and VLIW Processors, pp. 621–647, incorporated herein by reference. The results of speculatively executed instructions may be retired or discarded.

It is also known that profile data that characterizes program behavior can be obtained by performing test runs of the program. Such a technique is employed, for example, for profiled branch prediction.

Redundant speculative calculations may reduce effectiveness of software pipelining. Such calculations may occur during compilation of multi-way branch statements for VLIW pipelining. In general, multi-way branch statements can be expresses in the C language (used throughout this specification) as follows:

if (expression)
    statement(s)
  else if (expression)
    statement(s)
  else if (expression)
    statement(s)
  else
    statement(s)

A "switch" statement is a multi-way decision statement that tests whether an expression matches one of a number of constant values. For example, in C, the switch statement is expressed as follows:

switch (expression)
    case const_1:
      statement(s)
    case const_2:
    case const_3:
      .
      .
      .
    case const_m:
      statement(s)
    case const_n:
      statements(s)
    default:
      statement(s)

This multi-way branch in the switch statement is a barrier to flow transformations aimed at efficient use of hardware for predicated and speculative calculations. Implementation of the entire switch statement by constructing a set of conditionals, which are subsequently transformed to the predicated form, may lead to redundant speculative calculations.

Accordingly multi-way decisions, such as in the switch statements, require efficient compilation for software pipelining. Thus, it is desirable to improve compilation of multi-way brunch statements, and in particular switch statements, so as to reduce redundant speculative computations.

III. SUMMARY OF THE INVENTION

Computer method of compiling a multi-way decision statement for VLIW processing is described. The method comprises: (a) generating profile data for a multi-way decision statement, such as a switch statement; identifying at least one most probable alternative of the multi-way decision and a set of constants associated with the identified alternative using the profile data; determining a probable subset of the identified constants based on the profile data; constructing a conditional statement for the identified alternative using the probable subset of constants; and moving out the identified at least one alternative from the multi-way decision statement.

The condition for the alternative that has been moved out of the multi-way decision (e.g., case statement) is constructed using the probable subset of constants so as to form the condition such as illustrated below.

int x; const int c1, c2, . . . , cN;
if (x==c1 || x==c2 || . . . || x==cN) (1)
This condition is then transformed as follows:
If (cmax−cmin)<wint (wint is width in bits of integers used in this condition; cmin=min(c1, c2, . . . , cN); cmax=max(c1, c2, . . . , cN)), then the conditional statement (1) is equivalent to:

if (x<wint && (1<<(x−cmin) & cmask) !=0), (2)
where cmask=(1<<(c1−cmin)| . . . | 1<<(cN−cmin)) is a constant bit mask.

If cmax<wint expression (2) is simplified as follows:
if (x<wint && (1<<x & cmask2) !=0), (3)
where cmask2=(1<<c1| . . . |1 <<cN)

Expression (3) is further simplified as follows if cmax<wint and x<wint:
if ((1<<x & cmask2) !=0)

IV. BRIEF DESCRIPTION OF THE DRAWINGS

FIG. 1 illustrates a high level flowchart of compilation of the switch statement.

V. DETAILED DESCRIPTION OF THE PREFERRED EMBODIMENT

As known in the art, profile data that characterizes program behavior can be obtained by performing test runs of the program. Such a technique is known as profiled branch prediction. See, *Parallel and Distributed Computing Handbook,* Albert Y. Zomaya, Editor, McGraw-Hill 1996, chapter 21, incorporated herein by reference.

Profile data can be generated for a multi-way branch statement, such as a switch statement in the C language. In addition to standard methods of profiling (edge profiling or path profiling), the profiler of the preferred embodiment collects additional information for describing switch transformations. In particular, the profiler of this embodiment preferably collects information concerning the probability of selecting each separate constant in the switch statement. Profiling techniques used for compilation of the switch statements of the preferred embodiment are described in further detail below.

The generated profile data enables the compiler to identify one or several most probable alternatives within the switch statement. These alternatives are subsequently moved out of the switch statement and transformed to the predicate form. As known in the art (see, *Parallel and Distributed Computing Handbook,* Albert Y. Zomaya, Editor, McGraw-Hill 1996, ch. 21), the predicated execution provides for the instructions to be executed speculatively and their results may then be retired or discarded based on predicates.

According to the preferred embodiment, the compiler ascertains the most probable alternatives and moves them out of the switch statement. For each alternative of the switch statement, there is a set of relevant constants that permit selecting a given alternative within the switch. Before moving a given alternative out of the switch statement, the probable subset of the switch constants associated with this alternative is determined using the previously collected profile data. This subset is then employed for constructing the conditional statement for selecting this alternative when the alternative is moved out of the switch statement. If this subset of constants does not coincide with the original set of constants provided within the switch for selecting a given alternative, the alternative is moved out of the switch statement, but a copy of the alternative is also left in the switch statement so that it can be selected with the constants that were not part of the probable subset.

The condition for selecting the identified probable alternative, which has been moved out of the switch statement, is constructed as a disjunction of comparisons between the switch statement variable and each of the constants in the computed probable subset. This condition for the moved out alternative is constructed using a bit mask in accordance with the *Belonging to Set Check* procedure, explained in detail below, so as to reduce the number of operations.

The following example illustrates the transformation described above for a multi-way branch in a switch:

Before transformation:
switch(x)
{
  case const1:
  case const2:
  case const3:
  case const4:
  alternative1;
  case const5:
  alternative2;
  case const6:
  case const7:
  alternative3;
  case const8:
  alternative4;
  default:
  alternative5;
}

Assume for the purposes of this example that the probabilities of the constants in the switch determined on the basis of the profiled data are as follows:
probability of const1 is 0.1;
probability of const2 is 0.2;
probability of const3 is 0;
probability of const4 is 0.2;
probability of const8 is 0.4;
and the total probability of all other constants is 0.1.

Accordingly, alternative1 is the most probable alternative and the second probable alternative is alternative4. Based on this data, the switch statement of this example is transformed, in accordance with the disclosed method, as follows:

After transformation:
if (x==const1 || x==const2 ||x=const4)
  alternative1;
else if (x==const8)
  alternative4;
else
switch(x)
{
  case const3:
  alternatives; /* a copy of alternative1 remains within the body of the switch because const3 was not selected as part of the subset of constants "moved out" of the switch */
  case const5:
  alternative2;
  case const6:
  case const7:
  alternative3;
  default:
  alternative5;
}

It should be noted that the moved out alternatives are placed before the switch in the order of decreasing probabilities, i.e., the most probable alternative is the first one followed by the less probable one, in this order. Such an ordering is useful for the subsequent transformations performed by the compiler.

An alternative can be removed from the switch only if there are no control flow paths leading to this alternative. If there are such paths, a copy of the alternative must remain in the switch body. Thus, even if a given alternative is moved out of the switch and all the constants that select this alternative are included in the conditional statement outside of the switch, there may be circumstances requiring that such an alternative remains in the body of the switch statement.

This situation is illustrated by the following example:
```
switch( . . . )
{
    . . .
    case( . . . ):
    user_label:
    some_alternative; /* this alternative cannot be removed */
    . . .
}
. . .
goto user_label;
```

In this example, the alternative cannot be removed from the switch statement because in addition to being selectable through the switch constant, it is reachable through an additional label ("user-label").

It should be noted that the preferred switch optimization is based on probabilities of constants rather than only on probabilities of control flow edges. The following two examples illustrate the principle of the preferred compiler optimization of the switch statements:
```
switch(x)
{
    . . .
    case(1):
    case(150):
    case(1438):
    case(8729):
    case(123579):
    some_alternative;
    . . .
}
```
Let us assume that the probability of $((x==150)||(x==8729))$ is equal to 1.0. If the compiler has information about the probabilities of the edges only, it would need to construct the following condition:
$(x==1||x==150||x==1438||x==8729||x==123579)$ The above logical expression is harder to optimize in comparison to a simpler expression that can be obtained based on the probabilities of the constants. Namely, based on the probabilities of the individual constants, the compiler can construct the following simpler condition: $(x==150||x==8729)$.

Another example:
```
switch(x)
{
    case 1:
    case 2:
    alternative1;
    case 14:
    case 15:
    alternative2;
    default:
    alternative3;
}
```

In general, alternatives of a switch statement are selected based on a finite set of the corresponding constants. For this reason, the compiler is able to construct a disjunction for such alternatives. However, the default alternative has an essentially infinite (more precisely, a finite, but a very large one) set of constants. Let us assume that the more probable alternative in the proceeding example is the alternative3 (i.e., the default alternative) and the more probable constant is 5. If the compiler has information regarding probabilities of edges only, it would construct the following condition for the default alternative in this example: $(x!=1||x!=2||x!=14||x!=15)$. But, if the compiler has information regarding the probabilities of the constants, it can construct the condition $(x==5)$ and leave a copy of the default alternative in the switch body, which is a more efficient approach.

Profiling techniques employed in the preferred embodiments are now described in more detail. The preferred transformation for the switch statements is based on the probabilities of the values of the switch parameter (i.e., "x" in switch(x)). More precisely, the first step of the transformation (i.e., the selection of the probable alternatives) is based on the probabilities of control flow edges, and the second step (i.e., the selection of a probable set of constants for each selected alternative) is based on the probabilities of values of the switch parameter.

Information regarding the values of the switch parameter cannot be obtained using conventional edge profiling. It should be noted that for the transformation described herein, it is sufficient to collect only the profile data concerning the values of the switch parameter. The probabilities of the control flow edges in the switch statement can be determined from this information.

Usually, to obtain profile data, a compiler converts source code into a self-profiling code. This code works as a source code but, in addition, the self-profiling code collects information on its own behavior and passes it back to the compiler. A conventional edge profiling provides one counter for each control flow edge.

A compiler represents a two-way condition in the control flow graph as a control flow node with two outgoing control flow edges. To convert a two-way condition into self-profiling form, a compiler inserts a counter increment code on both outgoing edge. Such counter insertion methods are known in the art.

For example, self-profiling code for a two-way condition may be as follows:
Original source code:
```
if (condition)
    target_then;
else
    target_else;
```
Self-profiling code:
```
if (condition)
{
    Counters_Array[then_edge_number]++;
    goto target_then_label;
}
else
{
    Counters_Array[else_edge_number]++;
    goto target_else_label;
}
. . .
target_then_label:
    target_then;
. . .
target_else_label:
    target_else;
. . .
```

Now, let us consider a switch statement, for example, as presented in the example above. The source code in this example is as follows:
switch(x)

```
{
  case 1:
  case 2:
  alternative1;
  case 14:
  case 15:
  alternative2;
  default:
  alternative3;
}
```

To represent the switch statement of the above example in a control flow graph, one may construct a control flow node with 3 outgoing edges (one edge for each alternative). In this case, the resultant self-profiling code may be written as follows:

```
switch(x)
{
  case 1:
  case 2:
  Counters_Array[alt1_edge_number]++;
  goto alternative1_label;
  case 14:
  case 15:
  Counters_Array[alt2_edge_number]++;
  goto alternative2_label;
  default:
  Counters_Array[alt3_edge_number]++;
  goto alternative3_label;
}
...
alternative1_label:
alternative1;
...
alternative2_label:
alternative2;
...
alternative3_label:
alternative3;
...
```

After profiling of such a program, it is possible to determine the probability of edges, for example, (x==1||x==2), but the probability of constants, for example, (x==1), cannot be ascertained.

Alternatively, it is possible to construct for this example a control flow node with 5 outgoing edges (one edge for each "case" plus one edge for the "default"). In this case, the self-profiling code for this example may be written as follows:

```
switch(x)
{
  case 1:
  Counters_Array[case1_edge_number]++;
  goto alternative1_label;
  case 2:
  Counters_Array[case2_edge_number]++;
  goto alternative1_label;
  case 14:
  Counters_Array[case14_edge_number]++;
  goto alternative2_label;
  case 15:
  counters_Array[case15_edge_number]++;
  goto alternative2_label;
  default:
  Counters_Array[default_edge_number]++;
  goto alternative3_label;
}
...
alternative1_label:
alternative1;
...
alternative2_label:
alternative2;
...
alternative3_label:
alternative3;
...
```

Accordingly, in this example, after profiling, it is possible to determine, for example, the probabilities of (x==1) and (x==2) separately rather than only the probability of (x==1||x==2).

The last example illustrates how to obtain the maximum amount of information that can be obtained for a switch statement using only edge profiling. However, this approach does not provide for determining the probability of, for example, (x==5) which is not a constant in one of the case statements of the above examples. However, preferably, the default alternative should not be treated as a special case. The present method is preferably based on probable sets of constants and not on the entire sets of constants for a given alternative. Accordingly, even though the default alternative has a very large (practically infinite) set of constants, the probable set of constant is essentially always finite or empty.

One way of obtaining the probabilities of values of the switch parameter is to create a hash table for each switch statement. An example of a program employing such a hash table is illustrated below using the same original source code presented above:

```
entry=lookup(x,hash_table);
if (entry==NULL)
{
  entry=create_new_entry(hash_table);
}
increment_entry_counter(entry);
switch(x)
{
  case 1:
  case 2:
  alternative1;
  case 14:
  case 15:
  alternative2;
  default:
  alternative3;
}
```

Another, less time consuming method is for each switch statement to choose the range of values for which the system collects profile data. Of course, all the explicitly stated constants ("cases") of the switch (1, 2, 14 and 15 in this example) are in the chosen range. A heuristic, as discussed below, may be used to choose the remaining values in the range.

According to a method employing a range of values, self-profiling code may be written as follows:

```
if (x<=X_min||x>=X_max)
  range_violation_counter++;
else
  Switch_Value_Counters_Array[x-X_min]++;
switch(x)
{
  case 1:
  case 2:
``` alternative1;
case 14:
case 15:
alternative2;
default:
alternative3;
}

The heuristic for determining the range is now described in more detail. First, as noted, the range includes all the constants in the "case" labels of the switch statement. If the resultant range is greater than a selected threshold, a hash table should be used for profiling of this switch statement. Otherwise, the heuristics described below can be used for expanding the range while decreasing a probability of range bounds violations. It should be noted that such a bounds violation is not an error. In the event of such a violation, the counter of range bounds violations for this switch statement is incremented as illustrated in the previous example. However, profile data for separate constants out of range (all of which correspond to the default alternative) is not available.

More specifically, the heuristic for determining the range is as follows:

1. If range propagation analysis has been performed and there are results of this analysis for the switch parameter and the range obtained from this analysis is not more than a selected threshold, the range is computed using range propagation analysis.

2. If the switch parameter has a byte format (e.g. it is "char" in C), the range is [−128, 127] for a signed char and [0, 255] for an unsigned char.

3. If the switch parameter has a type declared using an "enum" declarator, and range of constants in this enum is not more than the threshold, the range is defined as a superposition of the initial range (i.e., the range of the "case" constants) and the range of constants of this enum.

For example:
typedef enum
{
  A0=0, A1, A2, A3, A10=10, A11
} some_enum_type;
. . .
some_enum_type x;
. . .
switch(x)
{
  case A3:
  case A10:
. . .
  case 12:
. . .
}

In this example, enum's range is [0, 11] and the initial range of the switch, ascertained from the case constants, is [3, 12]. So, in profiling the range [0, 12] is used.

4. If the lower bound of the initial range (based on the "case" constants) is equal to X or greater than X but close to it, the lower bound of the range is set to X, where X is 0 for an unsigned switch parameter and −1 for a signed switch parameter. Otherwise, the lower bound of the range is set to (initial_lower_bound−Y). See definition of Y below.

5. The upper bound of the range is set to (initial_upper_bound+Y).

Y in items 4 and 5 can be defined as:
max (((initial_upper_bound−initial_lower_bound)/Z), 1) where Z is a digit greater than 1. Z==5 is a good choice.

For example, in the example above, where case constants are 1, 2, 14 and 15, if x is declared as "int" and there is no data from range propagation analysis, in profiling the range is set to [−1, 17].

As noted, in this profiling it is not necessary to profile the outgoing edges. The counters for the edges may be obtained by adding counters for the corresponding constants.

Belonging to set check optimization procedure.

This optimization procedure is useful for compilation of switch and complex if constructions in general, as well as, for the compilation discussed above. It may also be employed for other compilations. This optimization enables efficient representation and evaluation of the flowing condition:

int x; const int c1, c2, . . . ,cN;
if (x==c1∥c2∥ . . . ∥x==cN) (1)

The optimization is as discussed below.

The data used for this optimization is defined as follows:
wint is width in bits of an integer data type,
cmin=min(c1, c2, . . . , cN),
cmax=max(c1, c2, . . . , cN).

If (cmax−cmin)<wint, the conditional statement (1) is equivalent to:

if (x<wint && (1<<(x−cmin) & cmask) !=0), (2) where cmask=(1<<(c1−cmin)¦ . . . ¦ 1<<(cN−cmin)) is a constant bit mask.

Expression (2) is simplified as follows if cmax<wint
if (x<wint && (1<<x & cmask2) !=0) (3)
Here
cmask2=(1<<c1¦ . . . ¦1<<cN)
Expression (3) is further simplified as follows if cmax<wint and x<wint:

if ((1<<x & cmask2) !=0)

It should be noted that all the tests illustrated above are unsigned, i.e. on the absolute value basis.

We claim:

1. A computer method, executed by an optimizing compiler program, for compiling a switch statement including one or more cases, and one or more alternatives, with each alternative selected by a subset of a full set of possible switch parameter values, with the method for execution on a VLIW-type CPU, said method comprising the steps of:

generating modified executable code based on the switch statement so that said modified executable code contains instructions and data structures collect profile data describing frequencies of the occurrence of various constant switch parameter values;

executing the modified executable code on the CPU and saving the collected profile data describing the frequencies of various constant switch parameter values into a profile data file;

observing the frequencies of occurrence of said constant switch parameter values in said profile data file to identify probable alternatives which are most likely to be selected based on the constant values in the profile data file;

for each identified probable alternative of said switch statement, identifying a probable subset of constant values, with the probable subset being those constant values in the full set with the highest frequency of occurrence;

generating optimized executable code including a conditional statement, based on an identified probable subset of constant values, constructed before said switch statement;

moving instructions of the identified probable alternative out of the switch statement; and scheduling moved instructions to be executed, prior to executing the switch statement, in the conditional mode under control of said conditional statement.

2. The method of claim 1, wherein the modified executable code contains the instructions and data structures for collecting the data describing the frequencies of switch parameter values pertaining to the alternatives with one corresponding constant value, alternatives with multiple corresponding constant values, and a default alternative of said switch statement.

3. The method of claim 2, wherein the modified executable code contains the instructions and data structures for allowing a non-default switch alternative with a set of corresponding constant values to collect the data describing separately the frequency of each constant value in said set of corresponding constant values.

4. The method of claim 3, wherein the modified executable code contains the instructions and data structures for allowing the default switch alternative to collect the data describing separately the frequencies of some constant values corresponding to the default switch alternative.

5. The method of claim 4, wherein, for a switch statement with a default alternative, the range of constant values pertaining to switch alternative frequency information to be collected is chosen heuristically on the basis of analysis of a full set of constant values pertaining to all non-default alternatives of the switch statement and analysis of the properties of the parameters of the said switch statement.

6. The method of claim 5, wherein the step of executing the modified executable code on the CPU is repeated with various sample data.

7. The method of claim 6, wherein the profile data file accumulates the data describing the frequencies of various switch parameter values for the switch statement collected during the execution of the modified executable code with various sample data.

8. The method of claim 7, wherein the probable alternative identified in the step of observing corresponding frequencies of occurrence is either a probable alternative with one corresponding constant value, a probable alternative with multiple corresponding constant values, or a probable default alternative.

9. The method of claim 8, wherein the probable switch alternative and the probable subset of the full set of constant values pertaining to the identified probable alternative is identified heuristically on the basis of relative frequencies of the said constant values.

10. The method of claim 9, wherein the conditional statement constructed in the step of generating the optimized executable code to control the instructions moved out from the switch alternative is generated in the form of instructions which define the actual value of a switch parameter "x" to be equal to one of the constant values which belong to the probable subset of the constant values [c1 . . . cn] corresponding to the said alternative.

11. The method of claim 10, wherein the instructions, which define the actual value of the switch parameter "x", with x being number represented by "wint" bits, to be equal to one of the constant values belonging to the subset of constant values [c1 . . . cn] with minimal value "cmin" and maximal value "cmax", are generated so as to calculate one of the following expressions:

((x<wint) && ((1<<(x−cmin)) & cmask)) !=0 or ((x<wint) && ((1<<x) & cmask2)) !=0 or ((1<<x) & cmask2) !=0 where "cmask" and "cmask2" are constant values which are computed in the generating step on the basis of the constant values belonging to the subset [c1 . . . cn] to the formulas cmask=((1<<(c1−cmin))| . . . |(1<<(cn−cmin)))

cmask2=((1<<c1)| . . . |(1<<cn)).

12. The method of claim 1 with the condition based on a disjunction of comparisons between the switch statement variable and each of the constant switch variable parameters included in probable subset of constant values.

* * * * *